US006874262B2

(12) United States Patent
Nishiyama et al.

(10) Patent No.: US 6,874,262 B2
(45) Date of Patent: Apr. 5, 2005

(54) METHOD FOR MANUFACTURING MASTER SUBSTRATE USED FOR MANUFACTURING GROOVED MOLDING SUBSTRATE, METHOD FOR MANUFACTURING STAMPER FOR MANUFACTURING GROOVED MOLDING SUBSTRATE, METHOD FOR MANUFACTURING GROOVED MOLDING SUBSTRATE, GROOVED MOLDING SUBSTRATE, MEMORY MEDIUM, MEMORY DEVICE, AND COMPUTER

(75) Inventors: Madoka Nishiyama, Kanagawa (JP); Seiji Morita, Kanagawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/406,438

(22) Filed: Apr. 4, 2003

(65) Prior Publication Data
US 2003/0224084 A1 Dec. 4, 2003

Related U.S. Application Data

(62) Division of application No. 09/772,928, filed on Jan. 31, 2001, now abandoned, which is a continuation of application No. PCT/JP99/03345, filed on Jun. 23, 1999.

(30) Foreign Application Priority Data

Jun. 1, 1999 (JP) ............................................ 11-153278

(51) Int. Cl.[7] ................................................. G03C 5/00

(52) U.S. Cl. ........................................................ 40/321

(58) Field of Search ................................. 430/321–325; 428/64.4; 369/257.1

(56) References Cited

U.S. PATENT DOCUMENTS

| 4,054,635 A | 10/1977 | Schlesinger et al. ........ 264/219 |
| 4,211,617 A | 7/1980 | Hunyar ........................... 204/5 |

(Continued)

FOREIGN PATENT DOCUMENTS

| EP | 0 527 602 A2 | 2/1993 |
| EP | 0 694 916 A2 | 1/1996 |
| EP | 0 880 130 A2 | 11/1998 |

(Continued)

OTHER PUBLICATIONS

"Advanced Optical Disk Mastering . . . ", Y.Kaneda; Trans.IEEE; v42(3);(1995), pp. 257–262.*

(Continued)

*Primary Examiner*—Mark F. Huff
*Assistant Examiner*—Kripa Sagar
(74) *Attorney, Agent, or Firm*—Morgan, Lewis & Bockius LLP

(57) ABSTRACT

A substrate having a photoresist coated thereon is exposed to exposure light along a line through a lens 1. The exposure position is moved from the initial position $O_1$ to a position $O_2$ that is separated from the initial position by a distance corresponding to the sum of a groove width Gw and a land width Lw. The exposure is carried out along a line parallel to the initial exposure line. By repeating this, exposed areas having a width Lw and a separation Gw are formed on the photoresist. The photoresist is developed to remove the exposed areas of the photoresist. A resin or the like is pressed on it to form a replica. From the replica, a stamper is manufactured using an electroforming method. Finally, a grooved molding substrate is manufactured from a glass or resin using the stamper. Although the land width Lw is defined by the effective spot diameter $\phi$ of the optical system, the groove width Gw can be less than this value.

11 Claims, 10 Drawing Sheets

U.S. PATENT DOCUMENTS

| | | | | |
|---|---|---|---|---|
| 4,366,235 A | * | 12/1982 | Land | 430/496 |
| 4,372,649 A | | 2/1983 | Kellie | 430/1 |
| 5,279,689 A | | 1/1994 | Shvartsman | 264/1.3 |
| 5,330,880 A | | 7/1994 | Horigome et al. | 430/321 |
| 5,389,313 A | | 2/1995 | Imataki et al. | 264/2.5 |
| 5,480,763 A | | 1/1996 | Kondo et al. | 430/320 |
| 6,159,664 A | | 12/2000 | Reuhman-Husken et al. | 430/321 |
| 6,365,329 B2 | | 4/2002 | Kerfeld | 430/321 |
| 2001/0000746 A1 | | 5/2001 | Edwards | 430/321 |
| 2001/0016301 A1 | * | 8/2001 | Edwards | 430/321 |

FOREIGN PATENT DOCUMENTS

| | | |
|---|---|---|
| JP | 59-180801 | 10/1984 |
| JP | 01-201844 * | 8/1989 |
| JP | 6-302018 | 10/1994 |
| JP | 8-96426 | 4/1996 |
| JP | 9-73653 | 3/1997 |
| JP | 10-241214 | 9/1998 |
| JP | 10-282677 | 10/1998 |
| WO | WO 96/04652 | 2/1996 |
| WO | WO 99/18572 | 4/1999 |

OTHER PUBLICATIONS

"New Applications of Submicrometer Structures in Materilas Science and Biology", Smith et al. SEM, v1, AMF O'Hare, (1978), pp 32–40.*

Keizer, E.O., "Videodisc Mastering", RCA Review, vol. 39(1), pp. 60–86.

* cited by examiner

METHOD FOR MANUFACTURING MASTER SUBSTRATE USED FOR MANUFACTURING GROOVED MOLDING SUBSTRATE, METHOD FOR MANUFACTURING STAMPER FOR MANUFACTURING GROOVED MOLDING SUBSTRATE, METHOD FOR MANUFACTURING GROOVED MOLDING SUBSTRATE, GROOVED MOLDING SUBSTRATE, MEMORY MEDIUM, MEMORY DEVICE, AND COMPUTER

This application is a Divisional of copending application Ser. No. 09/772,928 filed on Jan. 31, 2001 now abandoned which is a continuation of PCT International Application No. PCT/JP99/03345, filed in Japan on Jun. 23, 1999, which in turn claims the benefit of Japanese Application No. 11-153278, filed in Japan on Jun. 1, 1999, all three of which are hereby incorporated by reference.

BACKGROUND OF THE INVENTION

1. Field of the Invention

The present invention relates to a grooved molding substrate (a substrate formed by a stamper), which has narrow grooves (on which pits are formed) and is used for optical disks, magneto-optical disks, hard disks (magnetic disks), and the like, and a method for manufacturing the same. Moreover, the present invention relates to a method for manufacturing a master substrate used for manufacturing the aforesaid grooved molding substrate and the stamper. Furthermore, the present invention relates to a recording medium using the grooved molding substrate, a memory device using the recording medium, and a computer using the memory device. Since the grooved molding substrate according to the present invention can be formed to have narrow grooves having the width of 0.23 µm or less, the recording density can be enhanced by applying the present invention to optical disks, magneto-optical disks, hard disks, and the like.

2. Discussion of the Related Art

Data recording media, such as optical disks, hard disks, and the like, are capable of recording large quantities of information. Such data recording media are commonly referred to as CD's (compact disks), LD's (laser disks), DVD's (digital video disks, or digital versatile disks), etc. These data recording media may contain music, movies, software, etc. Such media also are used as storage devices in computers. Demand for such recording media is expanding greatly. Indeed, it is anticipated that optical disk and hard disk usage will continue to expand because these are the major recording media of the multimedia age.

Optical disks are classified according to the existence or absence of a recording layer, and are further classified according to the type of recording layer. Optical disk types include:

(1) The read-only type (CD, LD, CD-ROM, photo-CD, DVD-ROM, read-only type MD, etc.);

(2) The write-once type (CD-R, DVD-R, DVD-WO, etc.); and (3) The rewritable type capable of erasure followed by writing any number of times (magneto-optical disk, phase-change type disk, MD, CD-E, DVD-RAM, DVD-RW, etc.).

Moreover, the high density HD-DVD has also been proposed as a medium of the future.

Processes for manufacturing these optical disks begin with the molding of a raw material resin into a resin substrate. A raw material resin, for example, polycarbonate, acrylate resin, polystyrene, etc., is heated, melted or partially melted, and then is pressed using a stamper, thereby molding (manufacturing) a resin substrate. Typically, the molding method used is a pressure molding or injection molding method. The stamper forms fine concavities and protuberances which represent information copied upon the substrate surface. Other than resin molding, there is no such method for manufacturing large quantities of substrates that have minute concavities and protuberances in a short time period.

Types of pits and protuberances include:

(1) Pits that indicate a unit of information; and (2) Guide grooves that are provided for tracking by the pickup head.

Generally, the manufacture of data recording media involves circular substrates provided with pits and grooves on the substrate surface in the pattern of concentric circular rings or in a spiral pattern. The region between grooves along the radial direction is called a "land." Recording upon the lands occurs in the land recording method, or alternatively, recording occurs within the groove in the groove recording method.

In order to improve the recording density, the land/groove recording method was developed to record upon both the grooves and the lands. In this case, both grooves and lands are tracks, and the groove width Gw and the land width Lw are nearly equal. However, there are reasons for sometimes deliberately widening one or the other. Incident light enters the backside surface (flat smooth surface) of the substrate. In this case, the portion of the concavities and protuberances that is far from the backside surface is called "a land," and the portion of the concavities and protuberances that is close to the backside surface is called "a groove."

As the recording density increased, to meet the increased need for a larger storage capacity, the groove width, land width, and the pit width have decreased and their depth has increased. For example, the width has decreased from <1 µm to <0.3 µm and the depth has increased from >40 nm to >250 nm. As the width decreases and the depth increases (i.e., as the density becomes higher), molding of the resin substrate becomes increasingly difficult, and the yield of good products declines.

When manufacturing a hard disk, a magnetic recording layer is typically formed or deposited on an aluminum or glass substrate with recording carried out by a magnetic head. A reflection layer, a recording layer and a protection layer may then be formed on the resin substrate to produce the desired final product.

As the recording density increases, the recording layer becomes extremely flat and smooth. When the magnetic head becomes relatively still, the recording head and the recording layer adhere to one another and cannot separate. In order to avoid this phenomenon, a garage region (CSS region=contact stop and start) is provided. The surface of this garage region is deliberately finished with a rough texture using a laser so that surface adherence is prevented. Head tracking also becomes difficult as recording density increases. Therefore, it is proposed that a magnetic hard disk should be provided with grooves like an optical disk. Due to a demand for such roughness and grooves, resin substrates are proposed as a means to increase manufacturing productivity. Increased productivity results due to the formation of roughness and grooves in the substrate molding. In this case, material of the substrate is resin or low-melting glass.

Previously, molding tools were manufactured by the process described in Hunyar, U.S. Pat. No. 4,211,617, which corresponds to Japanese Patent publication Sho 59-16332, the disclosures of which are hereby incorporated by reference in their entirety. This related art (Hunyar) is explained with reference to FIGS. 9A to 11.

Generally, molding tools are manufactured using a glass substrate 3 that is polished with the precision of an optical surface. After the substrate 3 is cleaned, it is coated with a primer, for example, a silane-coupling agent. A photoresist 2 is then applied by spin coating and subjected to a pre-bake process. Positive-type photoresist 2, i.e., the type in which the region exposed to light is removed by development, is often used. This is because the surface roughness can be made smaller by the positive-type photoresist to have lower noise, which is advantageous. The following descriptions assume use of a positive-type photoresist.

Next, a laser beam recorder or a laser cutting machine is used to expose the photoresist 2 with a pattern of pits and/or grooves. The width of pits and grooves is generally determined by the laser spot diameter. In this case, in order to make the laser spot diameter as narrow as possible (i.e., to obtain a higher density), the laser beam is converged to the diffraction limit by a lens 1. On the other hand, the depth of the pits and grooves is generally determined by the thickness of the photoresist 2.

The case where a plurality of grooves exit in the pattern of concentric circular rings is explained in more detail. First, the photoresist 2 is illuminated by a predetermined exposure light along the first line $O_1$ via lens 1 (FIG. 9A). The illumination is continuous when forming grooves, and is intermittent when forming pits. The illuminated area (exposed area) becomes the first groove of the molding substrate afterward. In this method, the spot diameter of the exposure light directly defines the line width of the "exposed area" (hereinafter, the "exposed area" may also be referred to as "exposure area"). In this case, the minimum spot diameter is defined by the diffraction limit of the exposure light, and it depends on the wavelength λ of the exposure light. Because the light intensity distribution in the light beam exhibits the Gaussian distribution, the intensity is the strongest at the center and becomes weaker at the periphery. Therefore, the effective spot diameter (diameter of the removed area of the exposed photoresist by development) becomes smaller than the value determined by the diffraction limit because of the sensitivity of the photoresist and the developing condition. When an exposure method called a "narrow pencil writing," which uses only the center of the light beam by weakening the output of the light source, is used, the effective diameter can be made even smaller. In, the conventional method, the effective spot diameter φ determines the groove width of the resist pattern, and accordingly, determines the groove width Gw of the molding substrate. In, FIGS. 9A–9B, φ denotes the effective spot diameter.

At present, an argon laser light having the wavelength λ=351 nm is used for the exposure light. In this case, the minimum effective spot diameter φ is 0.23 μm. Accordingly, the minimum groove width Gw of the molding substrate that can be obtained is about 0.23 μm which is almost equal to φ (i.e., φ=groove width Gw).

When the groove width Gw needs to be large, the spot diameter is not made small to the diffraction limit, or exposure light in the out-of-focus condition is used. When the desired line width cannot be obtained by one exposure, another exposure similar to the first exposure can be performed repeatedly with the illuminating position moved by an appropriate distance. At any rate, the illuminating position is then moved from the first line $O_1$ to the second line $O_2$ separated by the distance corresponding to the sum of the groove width Gw and the land width Lw (which is parallel to the first line) (FIG. 9B).

After moving the exposure light to the position of the second line $O_2$, the photoresist is illuminated (exposed). Generally, this process is repeated plural times successively regarding the second line $O_2$ as the first line $O_1$. This way, a plurality of the exposure areas 2e of concentric circular rings is obtained (FIG. 9C).

A resist pattern having grooves and pits on the substrate surface is obtained by developing the exposed photoresist. Following the development, the resist pattern may optionally undergo a 20 to 60-minute post-bake at 80–120° C. When such a post-bake is used, the resist pattern is then cooled down to a room temperature. This is shown in FIG. 10A.

The resist pattern in combination with the substrate 3 shown in FIG. 10A is called the master substrate or master 4. The master substrate 4 is equivalent to the replica 46 in FIG. 4 of Hunyar U.S. Pat. No. 4,211,617.

The master substrate 4 undergoes a metallization treatment to form a conductive layer on the surface. Generally such a treatment is carried out by sputtering (dry-type method), or by non-electrolytic plating (wet-type method). Following the metallization, a thick plating layer, such as nickel (Ni), is formed on the master substrate 4 by an electroforming method. The double layer structure that is made of the conductive layer and the Ni plating layer is referred to as the "father stamper" or just the "father" or "stamper." This is shown in FIG. 10B. A free stamper 5 is obtained when the stamper 5 is peeled off from the master substrate 4. This is indicated in FIG. 10C. The stamper 5 is equivalent to mother member 52 in FIG. 6 of Hunyar U.S. Pat. No. 4,211,617.

Care must be taken during peeling since the stamper 5 is generally thin, approximately 200–300 μm in thickness. After peeling, the stamper 5 undergoes a solvent treatment, such as acetone treatment or the like, to remove the resist since a portion of the resist may remain on the stamper 5. The resist must be removed since the concavities and protuberances on the surface of the stamper would not otherwise be destroyed. Only a single stamper 5 is obtained from a single master substrate 4 since the resist pattern 2 is damaged during the peeling. The resulting stamper 5 has an extremely precise pattern of concavities-protuberances. Because the stamper 5 after peeling has a rather inaccurate outer dimension, a central hole is bored in the center of the stamper 5, and the unused portion of the outside perimeter is cut off. Before further processing, the concavity-protuberance surface (signal surface) is shielded with a protective coat. Thus, an annular shaped stamper 5 is obtained.

Then, a molding substrate is formed by using the stamper 5. A soft resin (or liquid resin) 6 is pressed against the stamper 5. This is shown in FIG. 10D. Accordingly, the concavities-protuberances of the stamper 5 are embossed on the resin. After cooling it down, the hardened or cured resin 6 is peeled off from the stamper 5 to form a molding substrate 6 shown in FIG. 11. The molding substrate 6 has the concavities-protuberances formed by grooves having the width Gw and the lands having the width Lw, which are disposed alternately. In order to manufacture the molding substrate, pressure molding or injection molding can be used. Generally, injection molding is used because of its high productivity.

As explained above, the width Gw of grooves (pits and dints, etc, are also generally referred to as "grooves") is determined by the wavelength λ and the effective spot diameter φ. Therefore, the molding substrate having the groove width Gw narrower than φ cannot be obtained. Since argon laser (λ=351 nm) is used presently, the minimum groove width Gw that can be formed is about 0.23 μm (230 nm). If the wavelength λ can be made smaller, it may be possible to reduce the groove width Gw. However, a proper light source having a shorter wavelength than that of argon laser has not been available to date because there exists no appropriate laser having a shorter wavelength with continuous oscillation, or photoresist that has sensitivity to such a short wavelength λ (ultraviolet light) and that makes it possible to etch groove walls vertically. Accordingly, the groove width Gw has the shortest value of about 0.23 μm thus far. However, as the demand for higher recording densities increases, development of technology capable of forming a finer groove width Gw has been strongly desired.

SUMMARY OF THE INVENTION

Accordingly, the present invention is directed to a method for manufacturing grooved molding substrate, a grooved molding substrate, a method for manufacturing a master substrate for use in manufacturing the grooved molding substrate, and a method for manufacturing a stamper for use in manufacturing the grooved molding substrate that substantially obviate the problems due to limitations and disadvantages of the related art.

An object of the present invention is to provide a molding substrate having a groove width Gw finer than the finest groove width (=φ) that is available in the conventional art, and a method for forming the same.

Another object of the present invention is to provide a method for manufacturing a master substrate and a stamper for fabricating the molding substrate with the aforementioned grooves.

A further object of the present invention is to provide an improved memory medium using the aforementioned molding substrate with the grooves, an improved memory device using the recording medium, and a computer using such an improved memory device.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for manufacturing a master substrate for producing a grooved molding substrate includes a preparing step that prepares a substrate on which a photoresist is coated; an exposing step that exposes the photoresist to light with a predetermined pattern such that the exposed part corresponds to a land of the grooved molding substrate to be produced; and a developing step that obtains the master substrate by developing the photoresist.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1A:
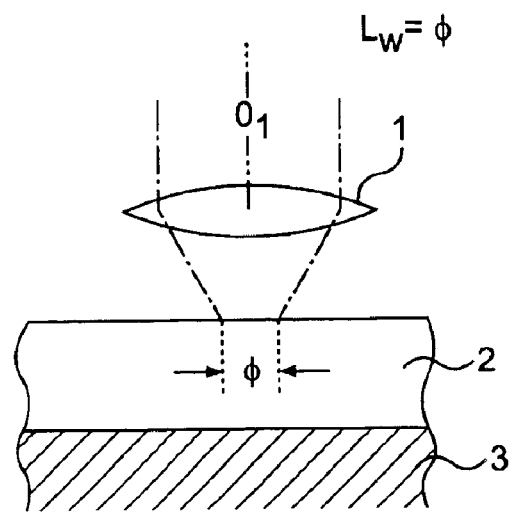
FIGS. 1A–1C, 2A–2C, 3, and 4A–4C illustrate a method for forming a grooved molding substrate according to a first preferred embodiment of the present invention.

Before describing the preferred embodiments of the present invention, work by the inventors, which lead to the present invention, is explained. As a result of diligent studies, the inventors discovered the following:

(1) When the land on a molding substrate is formed by the exposed area of a resist, and the groove width is determined by the separation between the first line and the second line, the groove width can be made smaller than the effective spot diameter φ.

(2) When a positive type photoresist is used, instead of manufacturing a stamper directly from a master substrate, after a replica (which has the surface profile that is reverse of the master substrate) is formed from the master substrate, a usable stamper can be manufactured from the replica such that the stamper has a surface profile that is same (that is, not reversed) concavities-protuberances as the master substrate.

Owing to these discoveries, the prevent invention provides, in a first aspect, a method for manufacturing a master substrate for producing a grooved molding substrate, including a preparing step that prepares a substrate on which a photoresist is coated; an exposing step that exposes the photoresist to light with a predetermined pattern such that the exposed part becomes a land of the grooved molding substrate, and a developing step that obtains the master substrate by developing the photoresist.

When the photoresist is of positive type, a replica is formed using the master substrate, and a stamper is manufactured using the replica. In contrast, when the photoresist is of negative type, a stamper is manufactured directly from the master substrate. A molding substrate can be manufactured using either stamper. Therefore, in the master substrate according to the first aspect of the present invention, a photoresist area (exposed area) where a pattern is exposed becomes an area corresponding to the lands (not groove) in the molding substrate, which is final product. Accordingly, the land width Lw is determined by the wavelength of the exposure light. The groove width Gw is determined by the separation between the adjacent exposed areas. In the present invention, the master substrate is manufactured by suitably arranging the separation between the adjacent exposed areas. By using such a master substrate, a narrow-grooved molding substrate that has been impossible to make can successfully be manufactured. (In the present invention, the remaining photoresist after development forms the protuberant portion, and the area where the photoresist was removed forms the concave portion in the master substrate. When the photoresist is removed all the way in the thickness direction, the groove depth formed in the grooved molding substrate corresponds to the thickness of the photoresist.)

In a second aspect, the present invention provides a method for manufacturing a master substrate for producing a grooved molding substrate, including a preparing step that prepares a substrate on which a photoresist is coated, an exposing step that exposes the photoresist to light with a predetermined pattern such that the exposed part becomes a land of the grooved molding substrate, a development step that creates a resist pattern by developing the photoresist, an etching step that etches a part of the substrate not covered by the photoresist, and a removal step that obtains the master substrate by removing the photoresist.

This aspect of the present invention also has similar effects to the first aspect. In addition, a master substrate that can be used repeatedly is obtained by suitably choosing the material of the substrate. Moreover, since the groove depth can be controlled by the etching depth, a deep groove that has been impossible to manufacture can be manufactured, and a groove having a steep sidewall and a smooth bottom surface can also be manufactured.

In a third aspect, the present invention provides a method for manufacturing a master substrate for producing a grooved molding substrate, including a first step that prepares a substrate on which a photoresist is coated, a second step that forms a part corresponding to a first land of the grooved molding substrate by illuminating and exposing the photoresist along a first line with exposing light, a third step that moves the illuminating position from the first line to a second line that is separated from the first line by a distance corresponding to the sum of a groove width Gw and a land width Lw of the grooved molding substrate, a fourth step that forms a part corresponding to a second land of the grooved molding substrate by illuminating and exposing the photoresist along the second line with the exposing light, and a fifth step that obtains the master substrate by developing the photoresist. In the case of forming a spiral pattern on a grooved molding substrate, the second through fourth steps above may be replaced with a step that forms a part corresponding to a spiral shaped land of a grooved molding substrate by illuminating and exposing along a spiral line having an interval corresponding to a distance corresponding to the sum of a groove width Gw and a land width Lw of the grooved molding substrate.

Using the master substrate manufactured by the third aspect of the present invention above, a narrow-grooved molding substrate that has been impossible to make can be manufactured for the reasons similar to those in the first aspect of the present invention. (In the present invention, the remaining photoresist after development forms the protuberant portion, and the area where the photoresist was removed forms the concave portion in the master substrate. When the photoresist is removed all the way in the thickness direction, the groove depth formed in the grooved molding substrate corresponds to the thickness of the photoresist.)

In the third aspect of the present invention above, the second through fourth steps are used for manufacturing a grooved molding substrate having the pattern of concentric circular rings. On the other hand, when a grooved molding substrate having a spiral pattern is to be manufactured, instead of the second through fourth steps, a step that forms a part corresponding to a spiral shaped land of a grooved molding substrate is performed by illuminating and exposing the photoresist along a spiral line having an interval corresponding to a distance corresponding to the sum of a groove width Gw and a land width Lw of the grooved molding substrate. It is needless to say that the first and fifth steps are needed in either case.

In the third aspect of the present invention, adjacent exposure areas are separated by a distance corresponding to the sum of a groove width Gw and a land width Lw of the grooved molding substrate to be manufactured (referred to as "exposure separation"). The land width Lw is determined by the exposure condition. The groove width is determined by the exposure separation amount subtracted by the land width Lw. Thus, a desired groove width Gw can be obtained because the exposure separation is set as described above. Since the groove width Gw is not determined by the exposure condition, the groove width can be made less than the effective spot diameter $\phi$.

In a fourth aspect, the present invention provides a method for manufacturing a master substrate for producing a grooved molding substrate, including a first step that prepares a substrate on which a photoresist is coated, a second step that forms a part corresponding to a first land of the grooved molding substrate by illuminating and exposing the photoresist along a first line with exposing light, a third step that moves the illuminating position from the first line to a second line that is separated from the first line by a distance corresponding to the sum of a groove width Gw and a land width Lw of the grooved molding substrate, a fourth step that forms a part corresponding to a second land of the grooved molding substrate by illuminating and exposing the photoresist along the second line with the exposing light, a fifth step that obtains a resist pattern by developing the photoresist, a sixth step that etches a part of the substrate not covered by the photoresist, and a seventh step that obtains the master substrate by removing the photoresist. In the case of forming a spiral pattern on the master substrate, the second through fourth steps may be replaced with a step that forms a part corresponding to a spiral shaped land of a grooved molding substrate by illuminating and exposing the photoresist along a spiral line having an interval corresponding to a distance corresponding to the sum of a groove width Gw and a land width Lw of the grooved molding substrate.

While the third aspect of the present invention uses concavity-protuberance of the developed resist pattern in the master substrate, the fourth aspect of the present invention uses the etched portion as the concave portion, and the remaining portion as the protuberant portion, as in the case of the second aspect of the present invention above. The groove depth of the grooved molding substrate formed by using the master substrate manufactured by the method according to the fourth aspect of the present invention is determined by the etching depth. This invention also has effects similar to those of the third aspect of the prevent invention. In addition, the groove depth can be controlled by the etching depth, and a groove having a steep sidewall and a smooth bottom surface can also be manufactured. Accordingly, when the substrate is used for a medium, a grooved molding substrate having low noise can be obtained. Moreover, this master substrate can be used repeatedly.

After finishing the fourth step and before starting the fifth step in the third and fourth aspects of the present invention above, a combination of the third and fourth steps may be carried out a plurality of times by regarding the second line in the fourth step as the first line in the subsequent third step.

By repeating the combination of the third and fourth steps a plurality of times, a master substrate for manufacturing a grooved molding substrate having a plurality of grooves of concentric circular rings or parallel stripes, for example, can be manufactured.

In the third and fourth aspects of the present invention, the groove width Gw may be set to about 0.1 µm or less. When such a substrate is used for optical disks, magneto-optical disks, hard disks, and the like, the use of the groove width Gw of about 0.1 µm or less can greatly increase the recording density relative to that of the conventional grooved molding substrate.

In the third and fourth aspects of the present invention, the groove width Gw may be set to about 0.06 µm or less. When such a substrate is used for optical disks, magneto-optical disks, hard disks, and the like, the use of the groove width Gw of about 0.06 µm or less can further increase the recording density relative to that of the conventional grooved molding substrate.

In the third and fourth aspects of the present invention, the groove of the grooved molding substrate may be a hollow, a pit, or discontinuity. In such a case, since the groove of the grooved molding substrate is a hollow, a pit or discontinuity, in a grooved molding substrate formed by using the master substrate manufactured in accordance with the present invention, the groove becomes a hollow, a pit, or discontinuous. Accordingly, the arrangement of those can represent binary information.

In a fifth aspect, the present invention provides a method for manufacturing a stamper, including an additional step that, after obtaining the master substrate manufactured by the method for manufacturing a master substrate for producing a grooved molding substrate according to any one of the first to fourth aspects above using a positive type photoresist as the photoresist, manufactures a replica from the master substrate, and a further additional step that manufactures the stamper from the replica by using an electroforming method.

In any one of the first through fourth aspects above, when a positive type photoresist is used, the exposed area becomes a concave portion of the resist pattern. Therefore, if a stamper is directly manufactured from the master substrate by using an electroforming method, the exposed area would correspond to the groove of the resulting grooved molding substrate, which is similar to the conventional art. Accordingly, in order to reverse concavities-protuberances, a replica is created from the master substrate, and a stamper is manufactured from the replica by using an electroforming method or the like. Using the electroforming method, an accurate stamper having a fine surface roughness can easily be manufactured.

In the fifth aspect above, the replica may be made of a metal or resin. When a metal is used for the replica, the replica is manufactured from the master substrate by using an electroforming method. When a resin is used for the replica, the replica is manufactured by pressing a ductile resin on the master substrate and curing it, and is duplicated. In either case, an accurate replica having a fine surface roughness can be manufactured. It is preferable to use a resin because the replica can be obtained more easily. Moreover, when concavities-protuberances is formed on the master substrate by etching, as in the case of the second and fourth aspects above, the master substrate can be used repeatedly.

In a sixth aspect, the present invention provides a method for manufacturing a stamper for producing a grooved molding substrate, including an additional step that, after obtaining the master substrate manufactured by a method for manufacturing a master substrate for producing a grooved molding substrate according to any one of the first to fourth aspects above using a negative type photoresist as the photoresist, manufactures the stamper from the master substrate by using an electroforming method.

In any one of the first to fourth aspects above, if a negative type photoresist is used, the exposed area corresponds to a protruding portion of the resist pattern. Therefore, when a stamper is directly manufactured from the master substrate by using an electroforming method, the exposed area becomes the land of the resulting grooved molding substrate. Accordingly, a stamper is directly manufactured from the master substrate by using an electroforming method in contrast to the fifth aspect of the present invention above. Using the electroforming method, an accurate stamper having a small surface roughness can easily be manufactured.

In a seventh aspect, the present invention provides a method for manufacturing a stamper, including a preparing step that prepares a substrate on which a photoresist is coated, an exposing step that exposes the photoresist to light with a predetermined pattern, a developing step that creates a resist pattern by developing the photoresist, an etching step that etches a part of the substrate not covered by the photoresist, a removing step that obtains a master substrate by removing the photoresist, a forming step that forms a resin replica from the master substrate, and a manufacturing step that manufactures the stamper from the replica by using an electroforming method.

In the seventh aspect, since the pattern on the master substrate is constructed of the material of the substrate, the master substrate can be used many times when the substrate is made of a durable material. Moreover, since the etching depth can be controlled, the groove depth of the resultant grooved molding substrate can be controlled. Further, a grooved molding substrate having a small surface roughness can be manufactured. Furthermore, by manufacturing a stamper from a resin replica, the number of times the master substrate can be used increases. Since the electroforming method is used for manufacturing the stamper from the replica, an accurate stamper having a small surface roughness can be easily manufactured. A resin replica can be used repeatedly, and can manufacture any number of stampers.

Stampers manufactured in accordance with the fifth and sixth aspects above are used to manufacture a grooved molding substrate by forming a glass or resin with the stampers.

Using the present invention, a grooved molding substrate whose grooves correspond to unexposed areas of the master substrate can be manufactured. Accordingly, a grooved molding substrate whose groove width is narrower than the effective spot diameter φ determined by the wavelength of the exposure light can be obtained.

In an eighth aspect, the present invention provides a grooved molding substrate manufactured by an injection molding method using a stamper, wherein the groove width Gw is about 0.1 µm or less. When such a substrate having the groove width of about 0.1 µm or less is used for optical disks, magneto-optical disks, hard disks, and the like, the recording density can be greatly increased relative to that of the conventional grooved molding substrate.

The groove width Gw may be set to about 0.06 µm or less. When such a substrate having the groove width of about 0.06 µm or less is used for optical disks, magneto-optical disks, hard disks, and the like, the recording density can be further greatly increased relative to that of the conventional grooved molding substrate.

In the eighth aspect of the prevent invention above, the sloping angle of the sidewall of the groove may be set to about 85° or more. In this case, since the sloping angle of the sidewall of the groove is about 85° or more, noise is reduced, optical cross-talk between adjacent tracks is lowered, and thermal cross-talk (cross erasure) is reduced. Moreover, the wobble signal is accurately reproduced, CNR improves, and dropout of the various read-write signals becomes extremely low.

In the eighth aspect, the ratio of the groove depth d to the groove width Gw may be set to about 0.1 or more. In such a case, the greater the S/N ratio becomes, the lower the optical cross-talk between adjacent tracks and the thermal cross-talk (cross-erase) become. Moreover, the wobble signal is accurately reproduced, CNR improves, and dropout of the various read-write signals becomes extremely low.

In the eighth aspect, the groove may be a pit or discontinuity. In such a case, the arrangement of pits, or discontinuous grooves can represent binary information.

In a ninth aspect, the present invention provides memory media whose substrates are manufactured by any one of the methods for manufacturing a grooved molding substrate of the present invention described above.

In the ninth aspect, the memory medium means a medium on which information can be recorded, such as optical disks, magneto-optical disks, hard disks, and the likes. Using these grooved molding substrates as a substrate of the memory medium, a hard disk having a high recording density and a high S/N ratio can be obtained. In these memory media, the land is generally used for recording and the groove is generally used for tracking. Thus, the groove may be narrow although the land needs to have a certain width. In the molding substrate according to the ninth aspect of the present invention, while the land width is limited by the minimum width determined by the exposure optical system, the groove width can be made narrower than this limit so that recording density can be made high.

In a tenth aspect, the present invention provides memory devices having the memory media according to the ninth aspect of the present invention above. In the tenth aspect, using these memory media, memory devices having a high recording density and a high S/N ratio can be obtained.

In an eleventh aspect, the prevent invention provides computers having the memory devices according to the tenth aspect of the present invention above. Using these memory devices as a memory device for the computer, a memory device having the same memory capacity can be made small, or a memory device having the same dimension can be made to have a more memory capacity.

Reference will now be made in detail to the preferred embodiments of the present invention, examples of which are illustrated in the accompanying drawings.

In the following descriptions of the preferred embodiments, the photoresist is classified into positive type (preferable) and negative type. Master substrates are classified into master substrate I and master substrate II. As to grooves, grooves may be pits, hollows, discontinuous dints or the like.

According to the present invention, a molding substrate having the lowest groove width Gw of about 0.02 $\mu$m, or about 0.01 $\mu$m depending upon circumstances, can be manufactured. One special feature of the present invention is to make it possible to manufacture a groove having a width smaller than about 0.23 $\mu$m, which has not been achieved in the conventional art. In consideration of ease in manufacture and this feature of the present invention, the groove width is preferably about 0.01 $\mu$m to about 0.23 $\mu$m, more preferably about 0.02 $\mu$m to about 0.1 $\mu$m, and further preferably about 0.03 $\mu$m to about 0.08 $\mu$m.

According to the present invention, it is possible to manufacture the groove depth of about 1 nm to about 1 $\mu$m.

1. Manufacturing Grooved Molding Substrate by Positive Type Photoresist (FIGS. 1A–4C)

Master Substrate I

First, a substrate 3 is prepared. Although the substrate 3 is usually disk-shaped, it is possible for the substrate 3 to be polygonal or the like, not limited to a disk shape. Examples of the substrate 3 material include glass materials. Suitable glass materials include soda lime glass (green plate glass), aluminosilicate glass (white plate glass), alkali-free glass, low-expansion glass, crystalline glass, and ceramic materials. Quartz, for example, fused quartz or synthetic quartz, or even Si can be used as the ceramic material. Also, if desired, the substrate 3 may include a metal substrate material, such as, Al, Fe, Cu, etc.

To prepare a master substrate, the substrate 3 surface is polished with high precision in order to obtain a highly precision surface. It is also permissible to form a surface layer on the substrate surface. Examples of the suitable surface layer materials include:

(a) Silicon oxide compounds, such as $SiO_2$;
(b) Silicon-nitrogen compounds, such as $Si_3N_4$;
(c) Metal suicide compounds, such as $TiSi_2$;
(d) Metal, such as Ti, Al, Cu, Cr, Ta, Au, Ag, Pt, etc., and;
(e) Metal oxides or metal nitrides, such as $TiO_2$, TiN, $Al_2O_3$, AlN, $TaO_2$, $Ta_2O_5$, $Ta_3N_4$, etc.

Furthermore, it is also possible to form a surface layer by oxidation or nitration of the substrate surface. In many cases, the surface layer is formed by thin layer deposition technology, for example, vacuum deposition or sputtering. It is also possible in such cases to form layers of two or more such materials. It is also possible to utilize precision polishing, such as chemical mechanical polishing, etc., to improve the smoothness and flatness of the surface layer.

Having polished the substrate 3 surface, the surface is coated with a positive type photoresist 2. The photoresist may be applied by spin coating. Usually, a primer, such as a silane coupling agent coating, is applied to the substrate prior to photoresist coating. This primer improves adhesion of the photoresist 2 to the substrate 3. Yet, there are instances where a primer is not needed, such as where Cr, TiN, etc., exist in the surface layer. In general, in master substrate I, the photoresist depth determines the depth of pits and grooves. In the case of the master substrate II (described below), the etching time determines the depth of grooves.

After having applied a photoresist 2 coating, a low temperature pre-bake may be carried out to adjust the resist sensitivity. Subsequently, a laser beam recorder is used to illuminate the resist according to a prescribed pattern of pits, grooves, etc. The resist 2 is exposed in this manner.

A further explanation will be given in the case where a plurality of grooves are formed in the pattern of concentric circular rings. First, the photoresist 2 is illuminated by the predetermined exposure light with the effective spot diameter $\phi$ along a first line ($O_1$) via a lens 1 (FIG. 1A). During the exposure, the substrate 3 together with the photoresist 2 may be rotated relative to the first line $O_1$ around a predetermined center axis normal to the substrate surface to form a generally annular-shape illumination area. (Of course, either the exposure light or the substrate may actually be rotated while the other is fixed, or both may be rotated, to create the relative rotation.) The illuminated area (exposed area) will correspond to a first land (groove in the conventional art) of the molding substrate that will be manufactured. In FIG. 1A, $\phi$ denotes the aforementioned effective spot diameter and, in this case, becomes equal to the land width Lw.

Figure 1B:
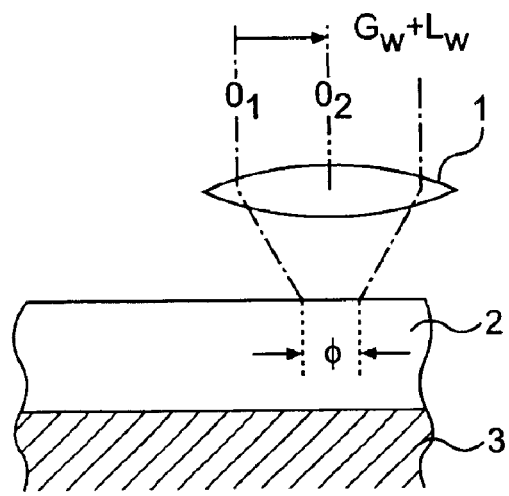

Then, the illumination position is moved from the first line $O_1$ to a second line $O_2$ that is separated by a distance corresponding to the sum of the groove width Gw and the land width Lw of the grooved molding substrate to be manufactured (FIG. 1B). Then, the photoresist 2 is exposed by exposing light. During the exposure, the substrate 3 together with photoresist 2 may be rotated relative to the first line $O_1$ around the predetermined center axis normal to the surface of the substrate so that the corresponding annular portion of the photoresist 2 is exposed. This completes the exposure to the portion corresponding to the second land. Here, if a parallel stripe-shape pattern is needed instead of the above annular pattern, the substrate 3 can be translated relative to the first and second lines in a direction parallel to the surface of the substrate 3 during the exposure. Thus, the direction of the relative movement between the optical axes and the substrate may be adjusted in accordance with the target pattern to be formed on the photoresist 2.

Figure 1C:
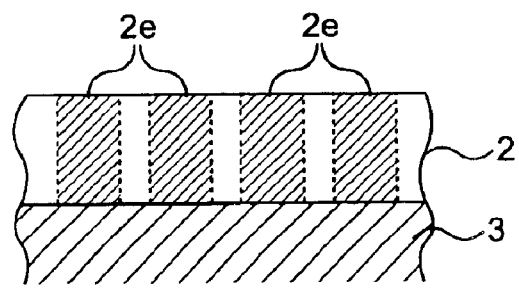

Generally, the steps of moving the illumination position and illuminating (exposing) the photoresist 2 just described above are repeated a plurality of times, successively regarding the second line in the previous step as the first line in the repetition. This way, the photoresist 2 is exposed along a plurality of concentric circular rings. The state where the exposure has completed is shown in FIG. 1C. The exposed areas are denoted by "2e."

While the repetition of the steps of moving illumination position and exposing the photoresist 2 is performed to form lands and grooves in a pattern of concentric circular rings, when a spiral shape is to be formed, the illumination (exposure) may be performed along a fictitious spiral line on the photoresist instead of the repetition of these steps.

Figure 2A:
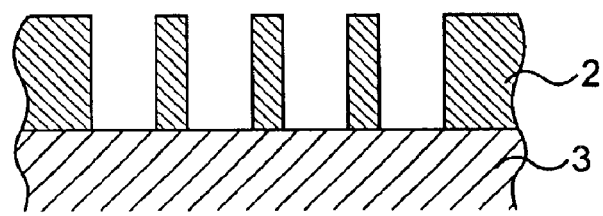

In the next step, the thus exposed resist 2 is immersed in a developing solution, and the resist is developed. Examples of the developing solution include solutions of inorganic alkaline compounds, such as sodium phosphate, calcium phosphate, sodium hydroxide, calcium hydroxide, etc. It is also possible to use an organic, rather than inorganic, alkaline solution. Since a positive type photoresist 2 is used here, the exposed area 2e dissolves in the developing solution. The dissolved resist is washed with ultra-pure water and the underlying substrate 3 is exposed at the dissolved portions. The substrate 3 processed in this manner has a photoresist 2 pattern on its surface. This is shown in FIG. 2A. This type of photoresist pattern 2 together with the substrate 3, or the pattern alone, is referred to as "resist pattern." Such a resist pattern is referred to as the master substrate I (reference numeral 4).

After development, it is possible to heat the master substrate I (4) to a somewhat high temperature in a post-bake. A post-bake is sometimes used to increase the sidewall angles of grooves and pits. Post-baking can also be used to improve the resistance of the resist to etching, to improve adhesion between the resist 2 and the substrate 3 and also to harden the resist surface. By increasing the photoresist hardness, the patterned photoresist 2 is able to endure subsequent processes, including metallization and the formation of a plating layer on the conductive layer by an electroforming method.

Master Substrate II

First, the master substrate I (4) is prepared in a manner described above. In the master substrate I (4), since the exposed portions of the resist 2 are dissolved and the substrate 3 is exposed at these exposed portions of the resist, the exposed regions of the substrate 3 can be etched so as to provide a concave region within the substrate 3. The thus created concave pattern corresponds to the resist 2 pattern.

The depth of the concave region is controlled by the etching time. The dry process is preferred for this etching although it is possible to utilize a wet process. Among dry processes, the reactive ion etching (RIE) method is particularly advantageous. Other etching processes that can be used include etching utilizing magnetron RIE, electron cyclotron resonance (ECR), induction-coupled plasma (ICP), helicon waves, etc. It is possible to use the RIE method using a normal low plasma density process (less than $10^{10}$ ions/$cm^3$). However, a high plasma density process (greater than $10^{11}$ ions/$cm^3$) is preferred in order to reduce the roughness of the etching region surface and the sidewall surface. Examples of such a high plasma density process include the RIE utilizing ICP or helicon waves that are advantageous for forming particularly fine patterns.

When dry etching is used, it is possible to form sharp sidewall angles within a front edge and a rear edge of a pit, with a preferred sidewall angle of about 90°. This is carried out to reduce reproduction signal jitter of the optical disk, for example. When a ceramic mold (master substrate II) is used, the pit and groove sidewall are not as rough as those of the resist pattern (master substrate I). If dry etching is used, the bottom surface of the concavity and the surface of the sidewalls have an extremely low surface roughness after etching. Various etching methods, not limited to dry processes, can form rather deep concavities with sharp sidewall angles. A deep concavity and a steep concavity sidewall angle can impart various types of benefits to an optical disk. These benefits include reduction of noise, lowering of optical crosstalk between adjacent tracks, and reduction of thermal crosstalk (cross erasure).

When a substrate 3 that has a surface layer is used, it is possible to just etch the surface layer. If the surface layer material and the underlying substrate material are etched at different rates, etching a substrate 3 that has a surface layer is advantageous since it becomes possible to carry out etching uniformly. When such a substrate with a surface layer is etched, the thickness of the surface layer determines the depth of the grooves, etc.

Typically, in the manufacture of the master substrate II, the remaining resist is removed after the etching process. The removal may be carried out by a dry etching process (ashing) using an oxygen plasma. Alternatively, the remnant resist is removed by immersion in a heated container holding a concentrated acidic solution, such as concentrated sulfic acid or concentrated nitric acid. Addition of hydrogen peroxide to such a solution improves resist removal. After the resist is removed in this manner, the substrate surface is washed with ultra-pure water, for example.

Figure 8A:
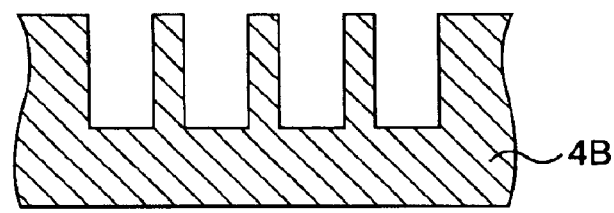
FIGS. 8A and 8B show master substrates according to preferred embodiments of the present invention.

In this manner, a substrate that has protuberances corresponding to the pits and grooves shown in FIG. 8A is obtained. The resultant substrate is the master substrate II (reference numeral 4B) according to the present invention. Ceramic material is particularly preferred as a material for constructing this substrate. Ceramic material is preferred since the ceramic surface is very smooth. In other words, the roughness (Ra) of the ceramic material surface is extremely low (Ra=10 nm or Ra=1 nm depending on circumstances). Optical disk noises are reduced when such a ceramic material is used for the manufacture of optical disks. The superiority of ceramic material sometimes is acknowledged by referring to the master substrate II (4B) as "ceramic mold."

Replica

A replica is modeled on the master substrate and has concavities-protuberances reversed from that of the master substrate. The material of the replica may be metal or resin. A metallic replica is manufactured by electroformation on the master substrate. This method is similar to the method for manufacturing a stamper, which will be described below. However, a resin is preferable for the material of a replica. In particular, a resin is preferable when the master substrate I is used because a resin replica makes it possible to use the master substrate I repeatedly. Thus, the case of using a resin replica is explained below in detail.

Figure 2B:
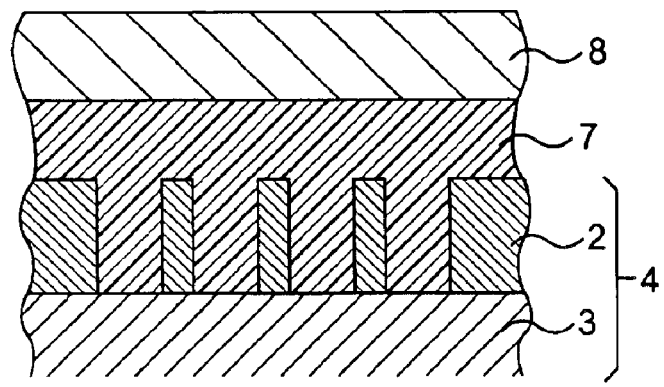

First, a master substrate 4 (master substrate I or II) is provided. A soft resin 7 is pressed against the concavity-protuberance surface (signal surface) of the master substrate 4. Then, the resin 7 is hardened or cured as shown in FIG. 2B. The hardened or cured resin 7 is a copy of the concavities-protuberances of the master substrate. The resin 7 is then peeled off from the master substrate to form a replica.

It is preferred that the resin 7 provides superior duplication performance when pressed against the master substrate. Resins with low viscosity or high fluidity generally have good duplication performance. A typical method for lowering viscosity involves heating and softening the resin. In this case, the resin 7 is subsequently cooled and hardened. Alternatively, the resin 7 may be mixed with a solvent. In this case, the resin 7 hardens when the solvent is volatilized. A preferred method employs a low viscosity material, such as a low molecular weight resin, prepolymer, or resin raw material. Additionally, such a material can be liquid. When the master substrate I is used for the resist pattern, it is particularly preferable to use a liquid type resin. It is also possible to mix a solvent with these materials to further lower the viscosity. In this case, a solid high molecular weight resin is used for polymerization (curing) of these materials at the master substrate surface. The thus produced resin reproduces the concavities-protuberances of the master substrate.

Among these methods, use of a low viscosity material, such as a low molecular weight resin, prepolymer, or resin raw material is particularly preferable. A way to promote polymerization in this method is heating or radiation exposure. Alternatively, two resin liquids may be mixed together, and the resin mixture may be allowed to simply react and polymerize. Ion beam radiation, electron beam radiation, ultraviolet radiation, far ultraviolet radiation, laser light, x-rays, synchrotron radiation, etc., are examples of the types of radiation that may be used. Ultraviolet radiation, however, is preferred due to ease in handling.

Figure 2C:
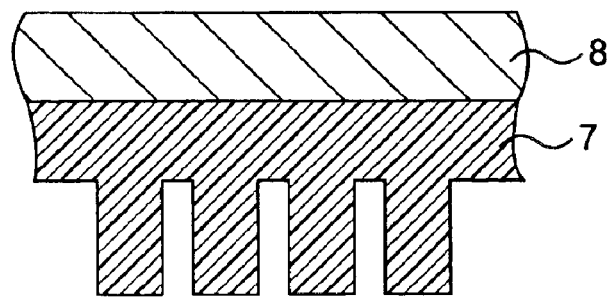

An example of the preferred method is explained with reference to FIGS. 2B and 2C. The master substrate 4 is placed with the concavity-protuberance surface facing upward while a low-viscosity ultraviolet-curing resin liquid 7 is poured slowly from above. A transparent plate 8, such as a glass plate, may be placed upon the resin liquid so as to avoid the introduction of bubbles. Ultraviolet radiation may be applied through the transparent plate 8, thereby causing the resin to cure. The cured resin 7 together with the transparent plate 8 is peeled off from the master substrate 4. A replica 7 constructed of two layers—cured resin 7 and transparent plate 8—is obtained in this manner.

A suitable transparent plate 8 may be a glass plate of at least about 0.6 mm thickness, preferably about 4 mm to about 10 mm thick. The glass plate should have a surface roughness that is low in comparison to that of the substrate 3 of the master substrate. A good surface roughness (Ra) value for the glass plate is about 5 nm to about 1 µm. It is also possible to use resin materials, such as, polycarbonate, polystyrene, polyolefins, acrylic resins, etc., rather than glass plate.

When a glass plate 8 is used, after first cleaning the plate, a primer, such as a silane coupling agent, may be used in order to improve adhesion between the resin and the glass plate. It is preferred that the primer is heated (baked) after it is applied.

Examples of the silane coupling agents which may be used as the primer include vinyl silanes, acrylsilanes, epoxy silanes, aminosilanes, etc. Examples of vinyl silanes include vinyltrichlorosilane, vinyltris(β-methoxyethoxy)silane, vinyltriethoxysilane, vinyltrimethoxysilane, etc.

Examples of acrylsilanes include γ-methacryloxypropyltrimethoxysilane, etc. Examples of epoxy silanes include β-(3,4-epoxycyclohexyl) ethyltrimethoxysilane, γ-glycidoxypropyltrimethoxysilane, γ-glycidoxypropylmethyldiethoxysilane, etc. Examples of aminosilanes include N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, etc. Other examples of silane coupling agents include γ-mercaptopropyltrimethoxysilane, γ-chloropropyltrimethoxysilane, etc.

Examples of other primers include silanes, such as chlorosilanes and alkoxysilanes, silazanes, or special silylating agents. It is also possible to mix two or more of these primers. The primer can be used as a dilute solution in a solvent, such as toluene, xylene, ethanol, methanol, isopropanol, etc.

Examples of the resin of the replica are listed below. Generally, the resin can be classified as either (A) thermoplastic resins or (B) thermosetting resins.

(A) Thermoplastic Resins

Examples of thermoplastic resins include, but are not limited to, polycarbonates, polystyrenes, styrene-type polymer alloys, polyolefins, polypropylenes, amorphous polyolefins, acrylate resins (such as polymethacrylates), polyvinylchlorides, thermoplastic polyurethanes, polyesters, nylons, etc.

(B) Thermosetting Resins

Examples of thermosetting resins include, but are not limited to, thermosetting polyurethanes, epoxy resins, unsaturated acrylate resins, etc. A preferred example is a curing resin solution mainly composed of urethanated poly(meth) acrylate, polycarbonate di(meth)acrylate, and acetalglycoldiacrylate.

When a thermosetting resin is used, a low molecular weight resin liquid is made to contact the master substrate. This resin solution can contain a curing catalyst or a curing agent. The curing catalyst is a photosensitizer when curing takes place due to ultraviolet radiation exposure. Typical example of photosensitizers that may be used include acetophenones, benzoin alkyl ethers, propiophenones, ketones, anthraquinones, thioxanthones, etc. It is also possible to use various types of photosinsitizers mixed together. In particular, 1-hydroxycyclohexyl phenyl ketone, etc., ketone-type photosensitizers are preferred due to their good duplication performance, mold releasability, and stability. Resins that cure upon exposure to ultraviolet light are called "ultraviolet curable resin," and are preferable for use as the resin of the stamper. Indeed, it is preferred that the resin does not adhere to the stamper, particularly during peeling off from the resin replica in a later process.

As to the resin solution, in consideration of absorption characteristics of heat and light, releasability of mold, light-resistance, durability, and hardness, it is preferable that the color number (APHA) is 30–50, and refractive index at 25° C. is 1.4–1.8. It is preferable for duplicating performance that the specific gravity and viscosity of resin solution at 25° C. are 0.8–1.3 and 10-4800 CPS, respectively.

In order to counter static electricity during the last electroforming process or ion plating process, it is possible to mix an anti-static agent into the resin liquid. Alternatively, a thin anti-static layer (such as a Pt layer) may be formed after the replica is completed. This type of anti-static treatment prevents problems, such as burning, deformation, peeling, contaminant attachment, etc. The skin of the peeled resin replica from the master substrate 4 has generally small surface roughness Ra.

Stamper

Figure 3:
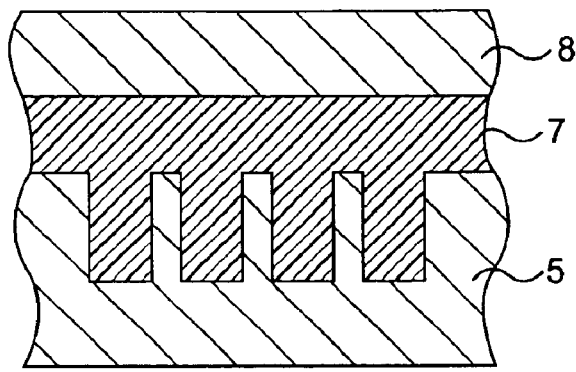

A stamper 5 is manufactured by plating the replica 7 using either a thick or a thin layer method (FIG. 3). The plating layer becomes the stamper 5. There are dry and wet plating methods. Among wet plating methods, there exist non-electrolytic plating and electrolytic plating. The dry method is called "vacuum layer deposition." Technologies for vacuum layer deposition include vacuum metallization, ion plating, sputtering, etc. Primary methods include dry plating and non-electrolytic plating. An alternative method (secondary method) is electrolytic plating. Plating may be carried out by either one of the methods.

The secondary method (electrolytic plating) is also called "electroforming." Electrolytic plating can form a thick plating layer in a short time period. Prior to carrying out electroforming, since the replica is not electrically conductive, a thin, generally about 30–100 nm, metal layer is formed on the replica. This metal layer is called "conductive layer" and this process is called "metallization."

Metallization is generally carried out by one of the primary methods. Although Ni (nickel) is a preferred metal, other suitable metals that may be used include Au, Pt, Pd, Ag, Ti, Ta, Cr, etc. It is also possible to use other highly conductive metals or metal compounds. It is also possible to use a metal that contains phosphorous. In particular, when Ni is used as the metal, it is possible to first form a primer layer made of another metal, or a metal containing compound, that has a thermal expansion coefficient substantially equal to that of Ni. In such a case, the conductive layer is formed on this primer. During or after electroforming, this primer layer can decrease the strain resulting from electroforming layer stress. This strain phenomenon may sometimes destroy the pits and grooves, and other concavities. This primer layer may be removed after the stamper 5 is completed.

Then the resin replica with the conductive layer is immersed in a plating solution in order to carry out electroforming. Preferably, a nickel sulfamate solution is used as this plating solution. A Ni plating layer is formed on the conductive layer as electroforming is carried out. This Ni plating layer is the stamper 5. It is also possible to use metals other than Ni. Alternatively, it is possible to mix other metals, i.e., Ti or elements, e.g., P with the Ni. Mixture with P can result in a mold with a great surface hardness. It is possible to obtain a hard stamper with a long working life by the use of a Ni—P, Ti—P, or Ni—Ti—P, etc., and/or by the use of alloy composition for the conductive layer or plating layer, or both the conductive layer and plating layer.

Moreover, it is possible to add other plating layers, for example, metals, such as silver, copper, or chrome, or alloys of such materials, to the Ni plating layer instead of a simple Ni plating layer.

The stamper 5 can also be manufactured by dry plating or non-electrolytic plating without using electroforming. The dry method avoids the problem of waste water treatment. Among such dry methods, ion plating is capable of providing a stamper that has particularly a low surface roughness.

Concavities-protuberances of the stamper disappear as the deposited plating layer thickness exceeds about 100 $\mu$m. That is to say, the surface of the plating layer appears flat. Generally, plating is stopped when the plating layer thickness reaches about 200 to about 600 $\mu$m, preferably, about 250 $\mu$m to about 300 $\mu$m. The stamper 5 is then completed.

At the completion of formation of the stamper 5, the stamper 5 is still attached to the replica 7. The stamper is thus peeled off from the replica 7. This peeling must be carried out carefully since the stamper 5 is a thin metal membrane (generally 250–300 $\mu$m thick). The peeled stamper 5 has a clean concavity-protuberance surface (shown in FIG. 4A). Although, in principle, it need not be cleaned, the stamper 5 may be optionally cleaned. The washing treatment typically involves either wet washing using organic solvent or purified water, or dry washing, such as ashing, plasma treatment, ultraviolet exposure, ozone cleaning, etc. (See also FIGS. 4–5 of Hunyar, U.S. Pat. No. 4,211,617 and the accompanying descriptions for a process for manufacturing a stamper from a replica.)

In order to improve the flatness of the stamper 5, prior to peeling off the stamper 5, or after peeling off the stamper, the back surface of the stamper may be mechanically polished. When such polishing is carried out after peeling, the concavity-protuberance surface (information surface) of the stamper 5 is given a protective coating in order to protect the stamper's concavity-protuberance surface. This protective coating is formed by applying a peelable protective coating, followed by drying.

After the stamper 5 is peeled off from the replica 7 and its back surface is polished, a hole is mechanically drilled in the vicinity of the center. The outer perimeter of the stamper 5 is removed in a similar manner. This results in a finished annulus-shaped stamper. Shipment of the stamper is then possible.

The surface roughness Ra of the resultant stamper is generally smaller than 10 nm. In most cases, a stamper has a surface roughness smaller than 1 nm. When a master substrate II is produced using the RIE method, the resultant stamper has almost no surface roughness. Thus it is possible to manufacture a particularly high quality stamper.

Forming Grooved Molding Substrate

Figure 4A:
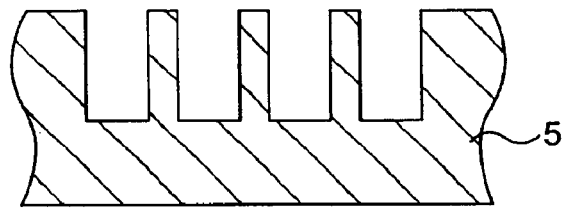
Figure 4B:
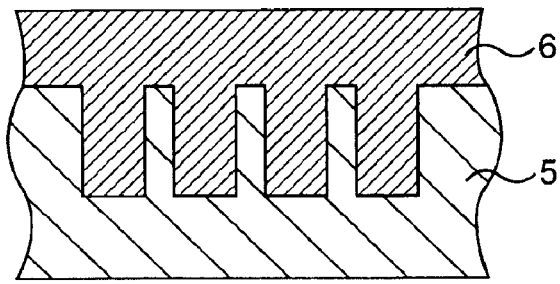
Figure 4C:
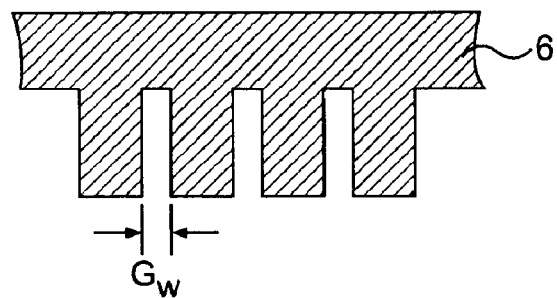

A grooved molding substrate is manufactured using a method for forming a copy of the concavities-protuberances surface of the stamper (FIG. 4B). Thus, a grooved molding substrate 6 having a groove width Gw smaller than the effective spot diameter $\phi$ is obtained. The formed grooved molding substrate 6 is shown in FIG. 4C. As compared with the grooved molding substrate manufactured in the conventional art, the groove width according to the present invention can be made much narrower. Methods for manufacturing grooved molding substrate include injection, pressing, casting, etc. The injection molding method has the highest productivity among these molding methods.

The resin that can be used for the grooved molding substrate of the present invention is generally a thermoplastic resin, particularly a relatively hard resin. Examples of such resins include polycarbonates, polystyrenes, styrene-type polymer alloys, acrylate resins (such as polymethacrylates), polyvinylchlorides, polyesters, nylons, ethylene-vinylacetate resins, amorphous polyolefins, etc. However, it is also possible to use a thermosetting resin if desired. Examples of such thermosetting resins include epoxy resins, thermosetting polyurethanes, unsaturated acrylate resins, unsaturated polyesters, diethyleneglycol-bis-allylcarbonate resins, etc. Glass materials having a low melting point can also be used instead of resins. The molding technology for the grooved molding substrate that is similar to the conventional art may be used.

2. Manufacturing Grooved Molding Substrate by Negative Type Photoresist (FIGS. 5A–7)

Master Substrate I

First, a substrate 3 coated with a negative type photoresist 2 is prepared. Since the following explanation is similar to the above case where the positive type photoresist is used, brief explanations are given.

Figure 5A:
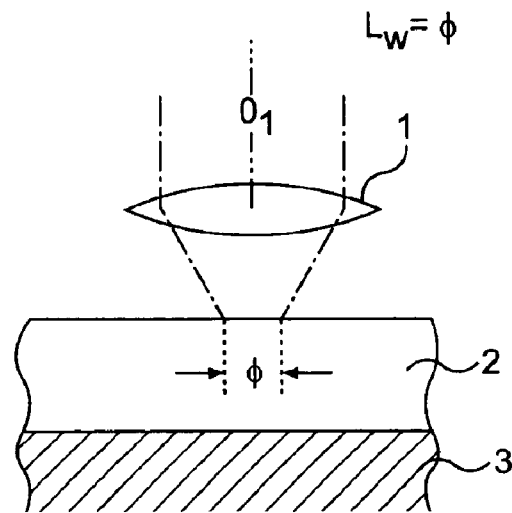
FIGS. 5A–5C, 6A–6D, and 7 illustrate a method for forming a grooved molding substrate according to a second preferred embodiment of the present invention.
Figure 5B:
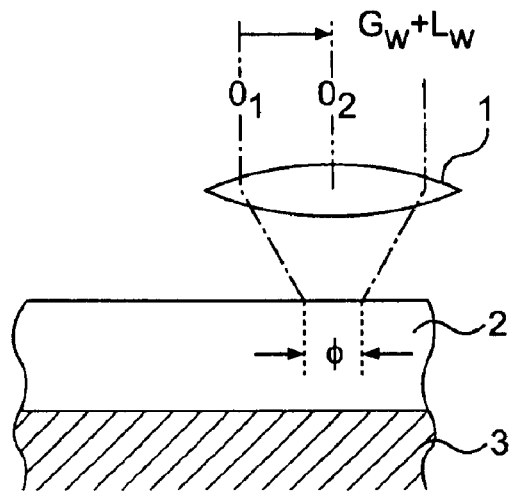

First, the photoresist 2 is illuminated by the exposure light along a first line $O_1$ (FIG. 5A). During the exposure, the substrate 3 together with the photoresist 2 may be rotated relative to the first line $O_1$ around a predetermined center axis normal to the surface of the substrate 3 to form an annular pattern of the illuminated (exposed) area. As a result, the portion corresponding to a first land is formed (the land width Lw=the effective spot diameter $\phi$). Then, the illumination position is moved from the first line $O_1$ to a second line $O_2$ that is separated by a distance corresponding to the sum of the groove width Gw and the land width Lw (FIG. 5B). The photoresist 2 is then illuminated by the exposure light. During the exposure, the substrate 3 together with the photoresist 2 may be rotated relative to the second line $O_2$ around the center axis to form a circular pattern of the exposed area. This way, the exposure to a portion corresponding to a second land (Lw=$\phi$) is completed. Here, if a parallel stripe-shape pattern is needed instead of the above circular pattern, the substrate 3 can be translated relative to the first and second lines in a direction parallel to the surface of the substrate 3 during the exposure. Thus, the direction of the relative movement between the optical axes and the substrate may be modified in accordance with the pattern to be formed on the photoresist 2.

Figure 5C:
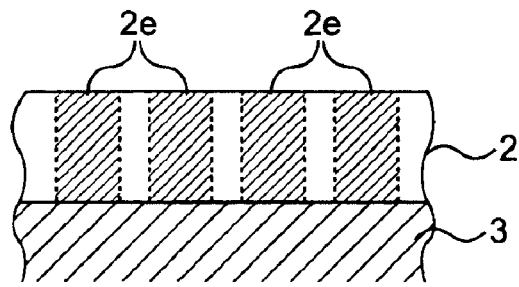

Generally, these movement and exposure steps described just above are repeated a plurality of times, regarding the second line in the previous step as the first line in the current step. As a result, the photoresist 2 is exposed along a plurality of concentric circular rings, for example. The state in which the exposure has completed is shown in FIG. 5C. The exposed areas are denoted by "2e." The unexposed areas will become grooves.

Although the repetition of these steps is used for forming lands and grooves in the pattern of concentric circular rings, when a spiral shape is needed instead, illumination may be performed in a spiral shape in place of the repetition of these steps.

Then, the exposed resist 2 is developed. Since a negative type photoresist 2 is used, the exposed areas 2e remain, and the unexposed areas dissolve in the developing solution. As a result, a photoresist pattern 2 shown in FIG. 6A is obtained and, a master substrate I (reference numeral 4) constructed of the pattern 2 and the substrate 3 is obtained.

Master Substrate II

Figure 6A:
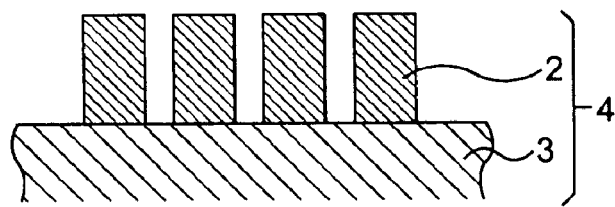
Figure 8B:
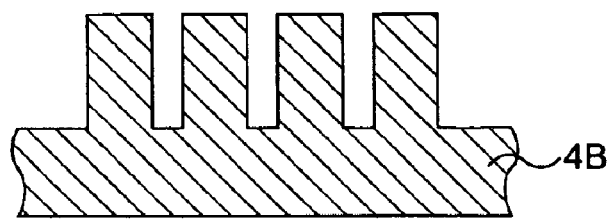
Figure 9A:
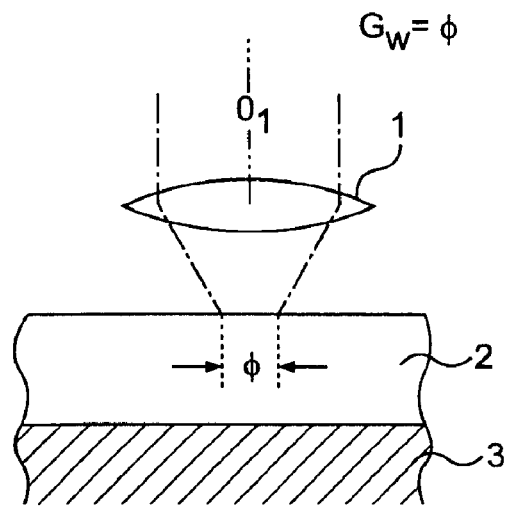
FIGS. 9A–9C, 10A–10D, and 11 illustrate a method for forming a grooved molding substrate according to the conventional art.
Figure 9B:
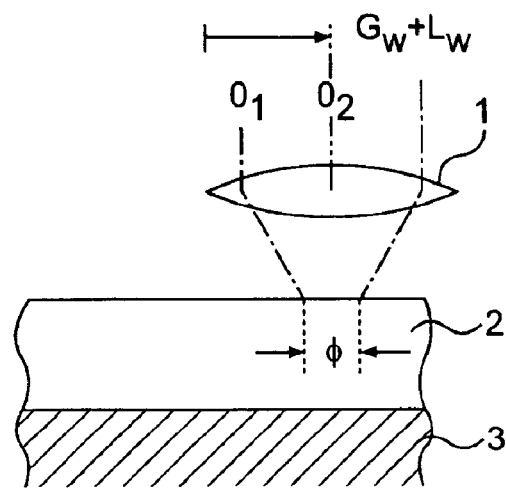
Figure 9C:
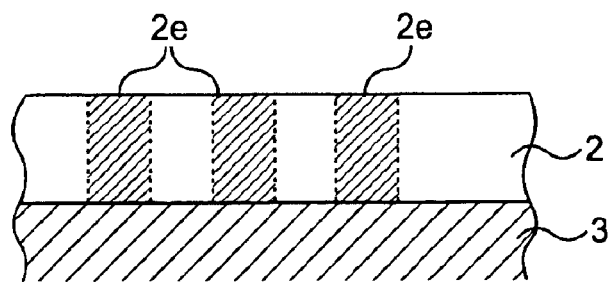
Figure 10A:
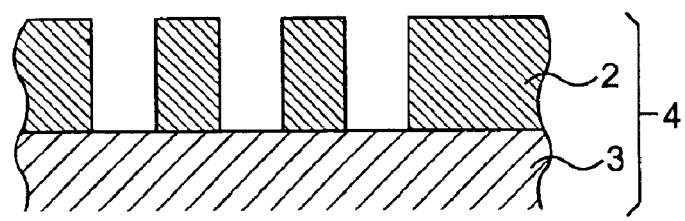
Figure 10B:
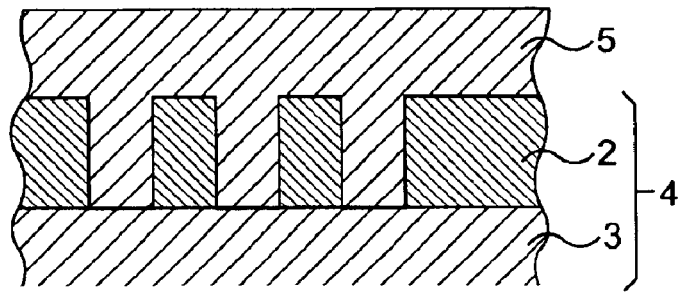
Figure 10C:
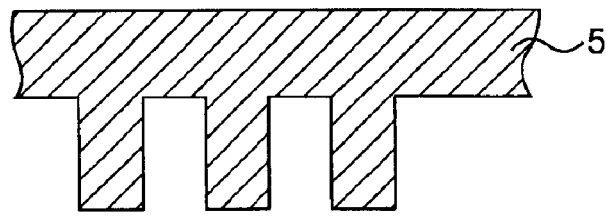
Figure 10D:
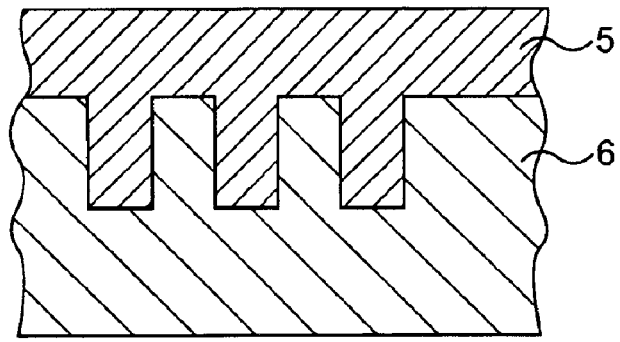
Figure 11:
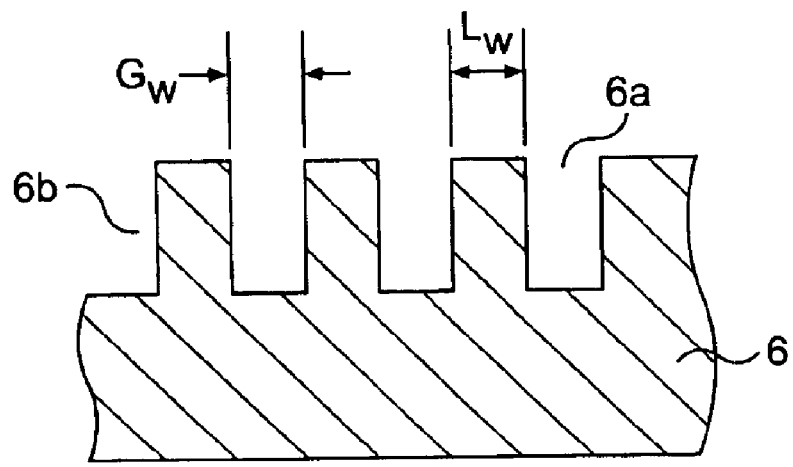

First, the master substrate I (4) shown in FIG. 6A is prepared. Then, the master substrate II (reference numeral 4B) shown in FIG. 8B is manufactured by etching and then removing residual resist in a manner described above in the context of manufacturing the master substrate II using a positive type photoresist.

Stamper

Figure 6B:
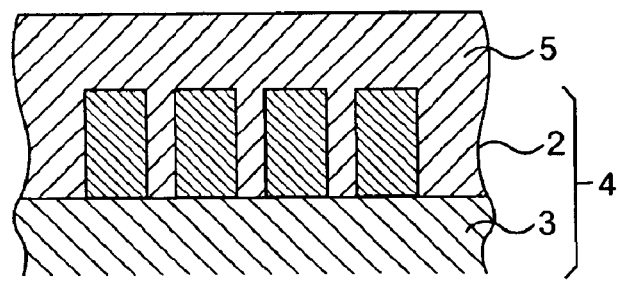
Figure 6C:
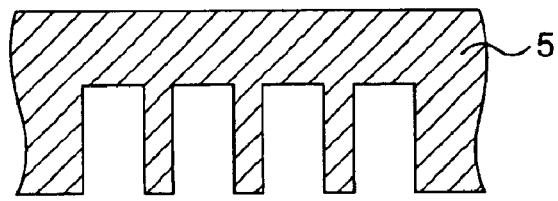
Figure 6D:
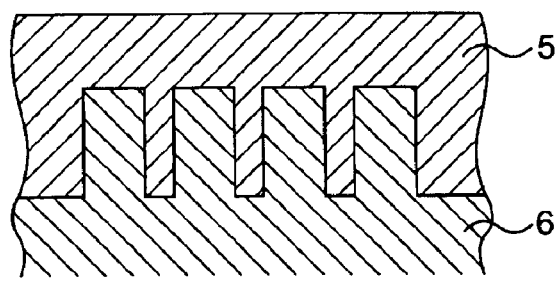
Figure 7:
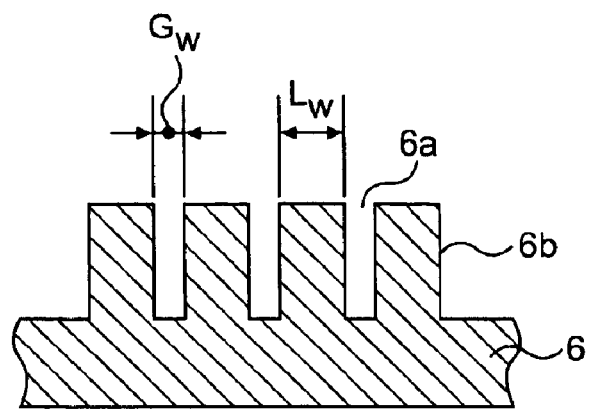

As shown in FIG. 6B, a stamper 5 is manufactured by plating the master substrate 4 (while the master substrate II can also be used, the master substrate I is used in the figure). The plating layer becomes the stamper 5. Further explanation is omitted because the method is the same as that in the case of using a positive type photoresist described above. A free stamper 5 shown in FIG. 6C is obtained by peeling the stamper 5 from the master substrate 4.

Accordingly, when the negative type photoresist is used, there is an advantage that the stamper can be obtained directly from the master substrate without using a replica.

Molding Substrate

A grooved molding substrate 6 having grooves 6a and lands 6b is formed of a resin or glass material by injection molding (resin) or pressing molding (glass) using the aforementioned stamper 5. See FIGS. 6D and 7. Further explanation of the method is omitted because it is the same as that in the case of using a positive type photoresist described above.

Hard Disk

Figure 12:
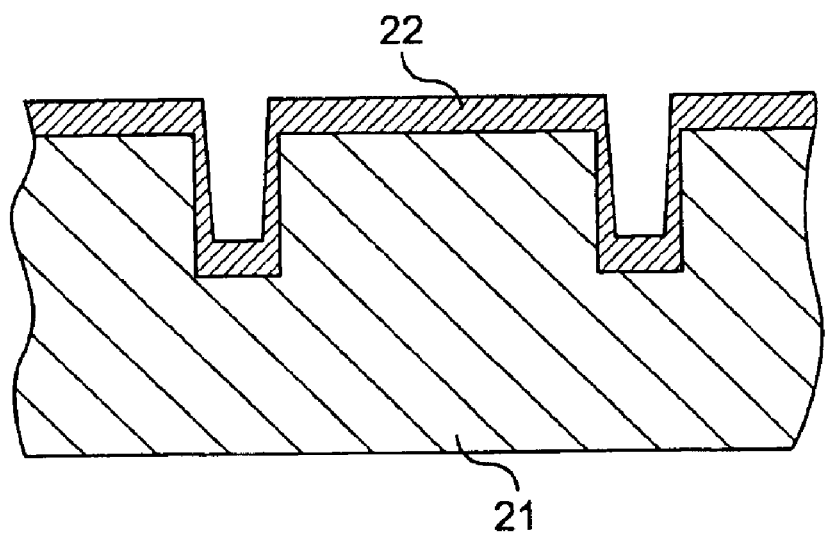
FIG. 12 is a schematic cross-sectional view of a hard disk according to the present invention.

FIG. 12 is a schematic cross-sectional view of a hard disk according to the present invention. A magnetic layer 22 is formed on a substrate 21 having lands and grooves. The molding substrate according to the present invention can be used as the substrate 21 of the hard disk. The material for the substrate is preferably a resin or a glass, and particularly, a low-melting glass is preferable. The substrate 21 has a spiral shaped groove or fine grooves in the pattern of concentric circular rings. The magnetic layer 22 is made from CoCr, CoCrPt, CoCrTa, and/or the like deposited by sputtering. Depending on circumstances, a protective layer and an under layer may be additionally formed on and under the magnetic layer, respectively.

In this example of hard disk, information is recorded on the lands, and grooves are used for tracking. Accordingly, the lands have to have a certain amount of width. The width has to be about the same or wider than that determined by the exposure optical system. On the other hand, grooves can be made narrower according to the present invention. Therefore, the recording density can be increased by using the substrate of the present invention as the substrate 21.

Hard Disk Drive

Figure 13:
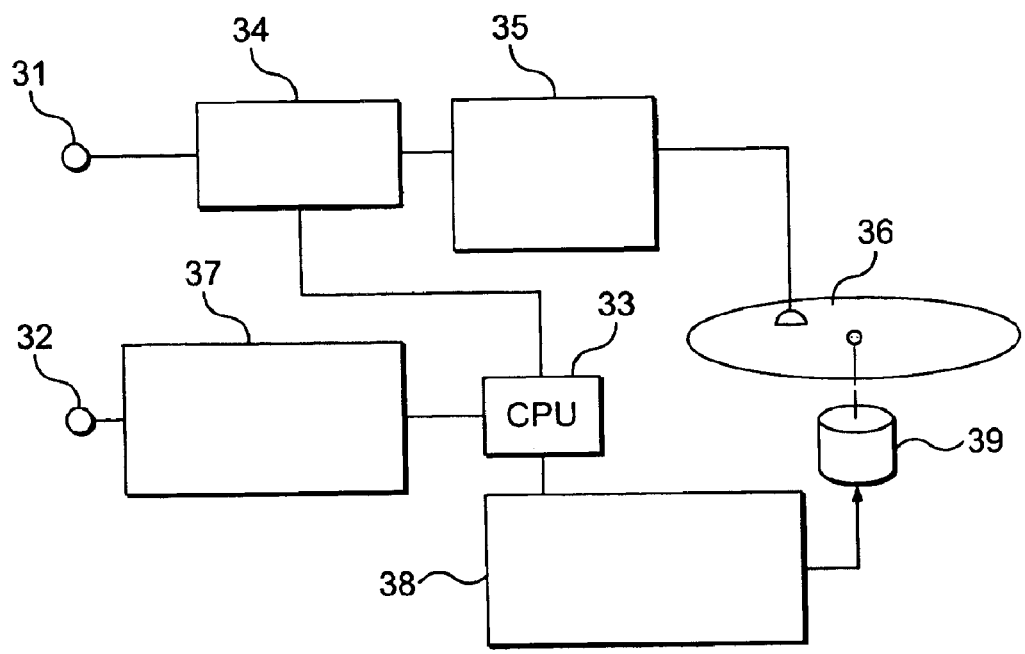
FIG. 13 is a block diagram of a hard disk driver according to the present invention.

As generally shown in FIG. 13, a hard disk drive according to the present invention is constructed of a data input terminal 31, and a data processing circuit 34 for processing data passing through the terminal 31, and a data recording/reproducing circuit 35 for converting the data processed in the circuit 34 into recording data, transmitting to a head 40, and for converting the data read by the head into reproduction signals. The hard disk drive is configured to receive a hard disk 36 on which data is to be recorded through the head or reproduced through the head 40. The hard disk drive further includes a motor 39 for driving the hard disk, a servo system control circuit 38 for controlling the motor 39, a control data input/output terminal 32, a control data processing circuit 37 for processing data input and output from the terminal 32, and a central processing circuit CPU 33 for controlling the circuits 34, 37, and 38, and for performing various calculations. Of course, the pre-existing data recorded on the hard disk 36 is reproduced through the head 40 and transmitted to the data recording/reproducing circuit 35.

The hard disk that is one of the recording media of the present invention can be used for the hard disk drive. In this case, a hard disk drive having a high recording density can be obtained.

Computer

Figure 14:
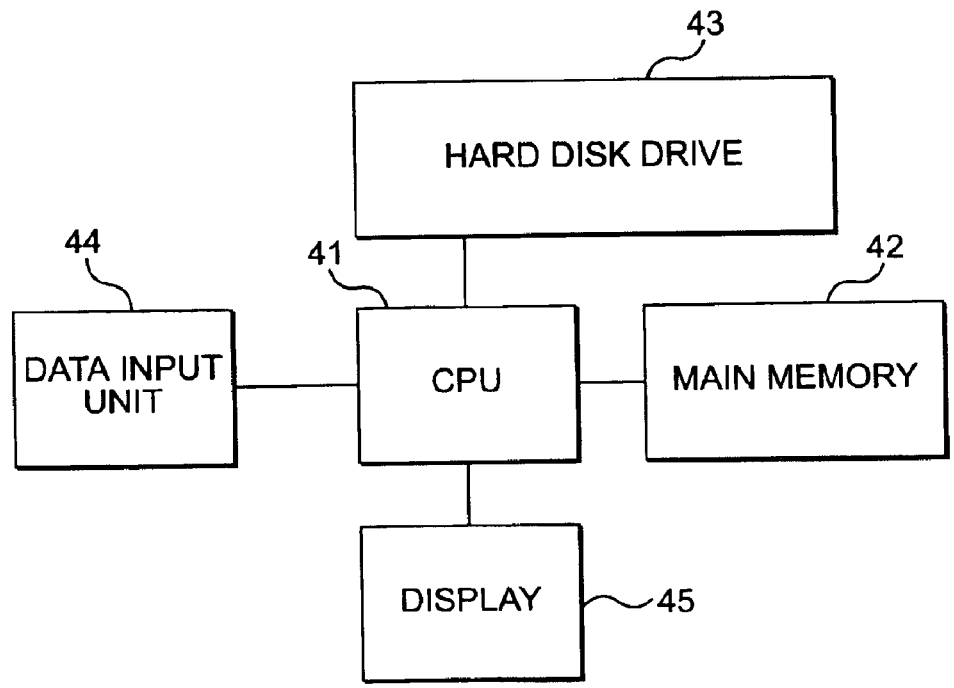
FIG. 14 is a block diagram of a computer according to the present invention.

As generally shown in FIG. 14, a computer according to the present invention is composed of a central processing circuit CPU 41, a main memory 42 (semiconductor memories, such as DRAM, SRAM, and pseudo SRAM, for example) for connecting the CPU 41 to an address space, a hard disk drive 43 as a secondary memory device, a data input unit 44 (such as keyboard, light pen, touch pad, digitizer, pen tablet, etc.), and a display 45 (such as CRT, liquid crystal display, etc.). The computer according to the present invention uses the hard disk drive of the present invention above.

First Working Example

A first working example is explained with reference to FIGS. 1A–4C. The groove width Gw of the grooved molding substrate is 0.04 μm that is smaller than the minimum groove width (0.23 μm) formed by the exposure light. The land width Lw of the grooved molding substrate is made to be 0.36 μm.

(1) Master Substrate II

First, a synthetic quartz plate was prepared as a substrate material. The substrate surface underwent precision polishing so as to have a surface roughness Ra of less than 1 nm. After washing, a first primer (hexamethyldisilane) and then a photoresist were applied by spin costing on the substrate surface. The substrate then underwent pre-bake, resulting in a roughly 0.2 μμm-thick photoresist layer 2 on the substrate 3.

Then, a laser cutting machine was prepared. The laser light source was Ar laser. For the exposure light, the output light having a wavelength of λ=351 nm was used. In this case, the effective spot diameter φ was made to be 0.36 μm by adjusting the output of the light source and other elements. In the present invention, λ determines the land width Lw of the grooved molding substrate.

The resist 2 was exposed by the exposure light in a spiral-shape land pattern. The exposure was carried out along the spiral such that the distance between the adjacent lines becomes the sum (0.40 μm) of the target groove width Gw (=0.04 μm) and the target land width Lw (=0.36 μm) of the grooved molding substrate to be manufactured. In a cross-sectional view of the exposed photoresist 2 that includes the radial direction, the exposed areas 2e and the unexposed areas were located alternately as shown in FIG. 1C. The exposed areas 2e correspond to lands of the molding substrate to be manufactured, and the line width of the exposed area 2e corresponds to the land width Lw of the grooved molding substrate that is to be manufactured. The line width of each exposed area 2e was 0.36 μm as a result of using the spot φ (=0.36 μm), which would produce lands having the land width of Lw=0.36 μm. Accordingly, the width of each unexposed area became equal to the groove width Gw=0.04 μm.

After the completion of exposure of the resist 2 on the substrate, the photoresist 2 was developed using an inorganic alkaline developing solution. The resist surface was spin-cleaned, followed by a post-bake, resulting in formation of resist pattern 2 shown in FIG. 2A. The master substrate I (reference numeral 4) was thus manufactured.

Subsequently, the master substrate I (4) was loaded into a reactive ion etching (RIE) apparatus, and dry etching was carried out. The etching was terminated when the depth reached to 80 nm.

The remaining resist was removed, and the substrate was cleaned, resulting in the master substrate II denoted by 4B in FIG. 8A. Thus, the pattern was created directly in the quartz substrate of the master substrate II.

Since the master substrate II was manufactured using the RIE process, the groove sidewalls, the pit sidewalls, and the pit front and rear edges were all extremely sharp. Among others, this imparts the following advantages (a)–(c) to the resulting optical disk:

(a) The wobble signal is accurately reproduced;
(b) CNR improves;
(c) Cross-erasure and crosstalk are reduced, dropout of the various read-write signals is extremely low, and noise also is greatly reduced since the roughness of the pit bottoms, pit sidewalls, groove bottoms, and groove sidewalls is extremely low.

(2) Resin Replica

An ultraviolet-curing resin solution was provided. This resin solution was prepared by mixing together (a) 70 parts of acetal glycol diacrylate having the following structural formula (1),

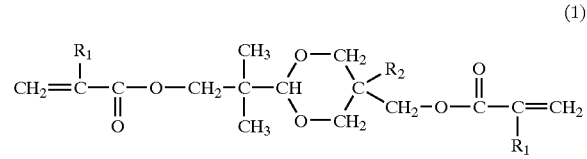

(1)

where $R_1$ is independently H or $CH_3$, and $R_2$ is independently $CH_3$ or $C_2H_5$; (b) 30 parts of urethane acrylate, which is a mixture of compounds having the following structural formula (2) and structural formula (3),

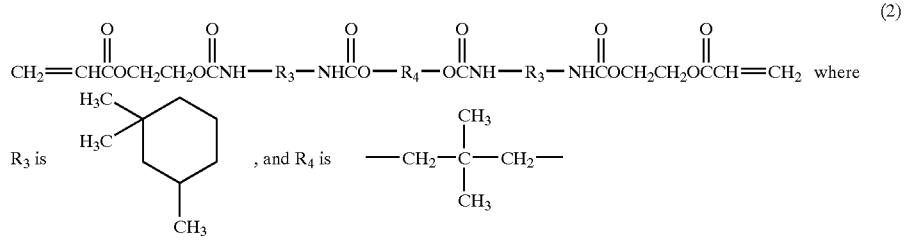

(2)

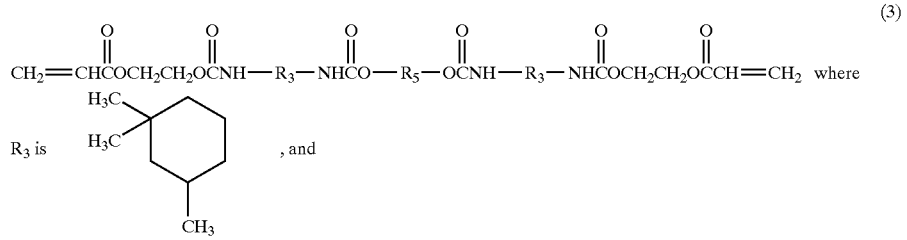

(3)

$R_5$ is $—CH_2CH_2CH_2CH_2O—[CH_2CH_2CH_2CH_2O]_{20}—CH_2CH_2CH_2CH_2—$; AND (c) 3 parts of 1-hydroxycyclohexyl phenyl ketone (commercial product name=IRUGACURE 184, manufactured by Ciba-Geigy Corp.).

A green glass disk was prepared separately. This green glass disk had a 200 mm outer diameter, a 10 mm inner diameter, and a 6 mm thickness. The disk was washed, and the surface was coated with silane coupling agent (primer) by the spin shower method. A 120° C. bake was carried out after the coating.

The master substrate 4 was placed with the concavity-protuberance surface upward, and the resin solution 7 made as described above was slowly poured on the substrate 4, as shown in FIG. 2B. The resin solution 7 was poured carefully to avoid bubble entrapment. Then, the glass disk 8 was pressed against the master substrate 4 so that the viscous resin solution 7 can be spread uniformly across the entire surface of the master substrate 4.

Then, the resin solution 7 was exposed through the glass disk 8 to ultraviolet radiation from a mercury lamp for about 5–60 seconds. The resin solution 7 was cured by this way, resulting in a cured resin layer 7. The hardened resin layer 7 becomes the replica. The structure of the replica is shown in FIG. 2B.

Next, the replica 7 was peeled off from the master substrate 4. This was carried out with considerable care so as to avoid damaging the replica and the master substrate. The surface roughness Ra of the replica was less than 1 nm.

(3) Manufacturing a Stamper

The replica 7 was placed within a sputter apparatus, and a Ni layer (conductive layer) of a roughly 40–70 nm thickness was deposited on the surface to perform a conductive treatment. When the concavities-protuberances of the replica are deep, sputtering is preferably carried out in an RF discharge. An RF discharge is affected adversely (for example, causing sputtering rate inhomogeneity) by static electricity on a replica. The sputtering was carried out in an RF discharge (electric power=400 W).

When the Ni layer is thick, the Ni plating layer sometimes subsequently peels off. In such an instance, the thickness of the Ni layer (conductive layer) is then reduced by 10–40 nm.

After the conductive treatment, the replica was next placed in a plating solution into which nickel sulfamate had been dissolved. The solution temperature was about 45–55° C. Then, the power was turned on to start Ni electroforming. The current density was low at the beginning. The current density was then gradually increased. The electroforming was terminated when the thickness of the resultant Ni plating layer reached 293 $\mu$m. The resultant stamper 5 was made mainly of this plating layer. This is shown in FIG. 3.

As shown in FIG. 3, the stamper 5 was still attached to the replica 7 immediately after production of the stamper 5. After the stamper 5 was peeled off from the replica 7, a free stamper 5 was obtained, as shown in FIG. 4A. The stamper has a surface profile that is reversed from the concavities-protuberances of the molding substrate that is to be manufactured as the final product. The line width corresponding to the land width Lw of the grooved molding substrate was 0.36 $\mu$m and the line width corresponding to the groove width Gw was 0.04 $\mu$m. The surface roughness Ra of the stamper was less than 1 nm.

Spin coating was used to apply a protective coating (commercial product name: "CLEAN COAT-S," manufactured by Fine Chemical Japan Inc.) on the stamper's concavity-protuberance surface. After coating, the coating was allowed to dry naturally FOR 10 hours, thereby shielding the concavity-protuberance surface with a protective coating. After polishing the back surface of the stamper 5, a circular center hole was bored, and unnecessary outer perimeter portions were removed, thereby completing the manufacture of an annulus-shaped stamper 5.

The replica 7 was not damaged after the stamper 5 was peeled away. Accordingly, the replica could be reused.

(4) Manufacturing a Grooved Molding Substrate

A Sumitomo Heavy Industries, Ltd., Model SD40 injection molding machine was used for injection molding. Polycarbonate (manufactured by Teijin Co., Ltd., product name: AD5503) was used as the resin of the molding substrate. This resin was loaded for feeding to this injection molding machine.

The stamper manufactured above was set in the molding machine. Molding of the molding substrate 6 was carried out under the following conditions: 130° C. metal mold temperature, 340° C. resin temperature, 30-metric ton injection pressure, and 12-second cycle time. The substrate thickness was 0.6 mm. 600 grooved molding substrates 6 were molded (manufactured) within 2 hours.

The shape and dimension of the grooves of the thus manufactured grooved molding substrate was observed and measured using an electron microscope (HR-SEM) and an atomic force microscope (AFM). The result of these observations showed that the groove depth, the land width, and the groove width were about 80 nm, 0.36 $\mu$m, and 0.04 $\mu$m, respectively. The slope of sidewall of grooves was steeper than 85°. A molding substrate having such superior characteristics has never been reported before.

Second Working Example

Another stamper was manufactured using the same method as in the first working example above. By using the stamper, a molding substrate with a plurality of grooves having a striped shape pattern (groove width Gw: 0.06 $\mu$m, land width Lw: 0.29 $\mu$m) was manufactured.

The shape and dimension of the grooves of the thus manufactured grooved molding substrate were observed using an electron microscope (HR-SEM) and an atomic force microscope (AFM). The result of these observations showed that the manufactured values are sufficiently close to the target values.

According to the present invention, the grooved molding substrate having the groove width less than the effective spot size $\phi$ (for example, less than about 0.23 $\mu$m), which has not been achieved in the conventional art, can be manufactured in large quantities with low cost by using injection molding or the like. A molding substrate having sidewalls of groove steeper than 85° can also be manufactured in large quantities with low cost by using injection molding or the like. The molding substrate according to the present invention is particularly useful for application to a hard disk.

It will be apparent to those skilled in the art that various modifications and variations can be made in the molding substrate, the manufacturing method thereof, and other aspects of the present invention without departing from the spirit or scope of the invention. Thus, it is intended that the present invention cover the modifications and variations of this invention provided they come within the scope of the appended claims and their equivalents. In particular, although the present invention was explained in detail in the case of using the molding substrate as an optical disk, the molding substrate of the present invention, manufacturing method thereof, and other aspects of the present invention have various other applications. Any kind of grooved molding substrate having minute concavities-protuberances can be molded in accordance with the present invention. Such a molding substrate may have various applications, such as magnetic disks (hard disks), optical cards, liquid crystal display devices, semiconductor devices, printer components, data write-rewrite devices, personal computer components, automotive components, etc. Such a molding substrate may also be optical components (such as zone plates, aspheric lenses, diffraction gratings, holograms, photomasks, or reticles) or encoder components. Preferably, the molding substrate is a data storage disk or an optical disk.

What is claimed is:

1. A method for manufacturing a master substrate for producing a grooved molded substrate comprising:
   (1) preparing a ceramic substrate on which a photoresist is coated;
   (2) exposing the photoresist along a line with exposing light having an effective diameter, the resultant photoresist having a linear part that is exposed to the exposing light and a linear part that is not exposed to the exposing light, the exposed part corresponding to a land of the grooved molded substrate to be produced, the unexposed part corresponding to a groove of the grooved molded substrate to be produced, the width of the exposed part being determined by the effective diameter of the exposing light and wider than the width of the unexposed part, the width of the unexposed part being determined by the width of the exposed part and a distance by which the exposing light is moved to expose the ceramic substrate along an adjacent line so that the width of the unexposed part is not greater than 0.06 μm;
   (3) developing the photoresist to form a resist pattern:
   (4) etching a part of the ceramic substrate using the resist pattern as a mask; and
   (5) removing the photoresist to yield the master substrate.

2. The method for manufacturing a master substrate for producing a grooved molded substrate according to claim 1, wherein the ceramic substrate is composed of glass or quartz.

3. A method for manufacturing a master substrate for producing a grooved molded substrate used for a data storage disk or an optical disk in which grooves work as guides for tracking, comprising:
   (1) preparing a ceramic substrate on which a photoresist is coated;
   (2) forming a linear part corresponding to a first land of the grooved molded substrate by illuminating and exposing the photoresist along a first line with predetermined exposing light;
   (3) moving an illuminating position from the first line to a second line by a distance corresponding to the sum of a groove width Gw and a land width Lw of the grooved molded substrate, where Lw is determined by an effective diameter of the exposing light, and Gw is determined by Lw and the distance by which the illuminating position moves from the first line to the second line so that Lw>Gw and Gw≦0.06 μm;
   (4) forming a linear part corresponding to a second land of the grooved molded substrate by illuminating and exposing the photoresist along the second line with the exposing light;
   (5) developing the photoresist to form a resist pattern;
   (6) etching a part of the ceramic substrate using the resist pattern as a mask;
   (7) removing the photoresist to yield the master substrate.

4. The method for manufacturing a master substrate for producing a grooved molded substrate according to claim 3, wherein steps (3) and (4) are repeated in that order plural times by successively regarding the second line in a previous execution of step (4) as the first line of a new execution of step (3).

5. The method for manufacturing a master substrate for producing a grooved molded substrate according to claim 3, wherein a groove of the grooved molded substrate is at least one of a pit, a hollow, and discontinuity.

6. The method for manufacturing a master substrate for producing a grooved molded substrate according to claim 3, wherein the ceramic substrate is composed of glass or quartz.

7. A method for manufacturing a master substrate for producing a grooved molded substrate used for a data storage disk or an optical disk in which grooves work as guides for tracking, comprising:
   (1) preparing a ceramic substrate on which a photoresist is coated;
   (2) forming a part corresponding to a spiral shaped land of the grooved molded substrate by illuminating and exposing the photoresist with exposing light having an effective diameter along a spiral line having a pitch corresponding to the sum of a groove width Gw and a land width Lw of the grooved molded substrate, where Lw is determined by the effective diameter of the exposing light, and Gw is determined by Lw and the pitch of the spiral so that Lw>Gw and Gw≦0.06 μm;
   (3) developing the photoresist to form a resist pattern;
   (4) etching a part of the ceramic substrate using the resist as a mask;
   (5) removing the photoresist to yield the master substrate.

8. The method for manufacturing a master substrate for producing a grooved molded substrate according to claim 7, wherein the sum of the groove width Gw and the land width Lw is substantially equal to a track pitch of the grooved molded substrate.

9. The method for manufacturing a master substrate for producing a grooved molded substrate according to claim 7, wherein the ceramic substrate is composed of glass or quartz.

10. A ceramic master substrate for producing a grooved molded substrate used for a data storage disk or an optical disk in which grooves work as guides for tracking, the ceramic master substrate having projecting parts and recesses on its surface arranged with a pitch, wherein the projecting parts and recesses are made by a photo-lithography process, the width of the projecting parts being determined by an effective diameter of the exposing light in photo-lithography and wider than the width of the recess, the width of the recess being determined by the width of the projecting part and a distance by which the exposing light is moved to expose an adjacent projecting part, and being 0.06 μm or less.

11. A master substrate for producing a grooved molded substrate used for a data storage disk or an optical disk in which grooves work as guides for tracking, the master substrate having projecting parts and recesses on its surface arranged with a pitch, wherein the width of the recess is 0.06 μm or less.

* * * * *